United States Patent [19]
Donofrio

[11] Patent Number: 5,855,158
[45] Date of Patent: Jan. 5, 1999

[54] MODIFIED ROOFING, SHINGLE, AND SIDING REMOVAL SAW BLADE

[76] Inventor: Thomas H. Donofrio, 2 Carpenter Rd., Stanhope, N.J. 07874

[21] Appl. No.: 907,376

[22] Filed: Aug. 7, 1997

[51] Int. Cl.$^6$ ................................................. B23D 57/00
[52] U.S. Cl. .............................. 83/835; 83/697; 30/346; 30/350; 30/357
[58] Field of Search ................... 83/835, 697; 30/346, 30/350, 355, 357, 392

[56] References Cited

U.S. PATENT DOCUMENTS

| | | | |
|---|---|---|---|
| 85,417 | 12/1868 | Andrews | 83/835 |
| 3,929,050 | 12/1975 | Salzwedel | 30/355 |
| 3,977,289 | 8/1976 | Tuke | 83/697 |
| 4,020,555 | 5/1977 | Hedrick | 30/392 |
| 5,119,708 | 6/1992 | Musgrove | 30/355 |
| 5,295,426 | 3/1994 | Planchon | 30/392 |
| 5,421,091 | 6/1995 | Gerritsen, Jr. | 30/392 |
| 5,555,788 | 9/1996 | Gakhar et al. | 83/676 |
| 5,644,847 | 7/1997 | Odendahl et al. | 30/392 |
| 5,692,308 | 12/1997 | Di Libero | 30/357 |

FOREIGN PATENT DOCUMENTS

| | | | |
|---|---|---|---|
| 272075 | 3/1965 | Australia | 30/346 |

*Primary Examiner*—M. Rachuba

[57] ABSTRACT

A modified reciprocating saw blade for use in association with a saw blade holder, shingles and nails, the apparatus comprises a blade member being formed in an elongated planar configuration with an inboard end, an outboard end and a central section, the inboard end being formed as a universal blade mount to permit coupling to a saw blade holder in an operative orientation, the central section having parallel linear upper and lower edges; and the outboard end of the blade member having an upper edge and a lower edge, the lower edge including a cutting region having a length of about one-third of the total length of the blade member, the cutting region including a plurality of cutting teeth, in an operative orientation the inboard end of the blade member being coupled to a saw blade holder, the configuration of the blade member permitting a user to cut nails which secure shingles without damaging adjacent shingles.

1 Claim, 1 Drawing Sheet

MODIFIED ROOFING, SHINGLE, AND SIDING REMOVAL SAW BLADE

BACKGROUND OF THE INVENTION

1. Field of the Invention

The present invention relates to a modified roofing, shingle, and siding removal saw blade and more particularly pertains to cutting nails which secure shingles and the like to a mounting surface without damaging adjacent shingles.

2. Description of the Prior Art

The use of saw blades is known in the prior art. More specifically, saw blades heretofore devised and utilized for the purpose of cutting various items are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 4,802,396.to Kuklinski a saber saw blade.

U.S. Pat. No. 5,331,876 to Hayden, Sr. discloses a saw blade for cutting metal.

U.S. Pat. No. 5,031,324 to Berghauser et al. discloses a power driven saw with reciprocating saw blades.

U.S. Pat. No. 5,063,675 to Michas et al. discloses a low profile hacksaw.

U.S. Pat. No. 4,277,104 to Sanchez discloses a reciprocating shingle remover with upward thrust blade.

U.S. Pat. No. 5,001,946 to Shirlin et al. discloses a roof shingle stripping apparatus.

Finally, further pertinent references include a U.S. Pat. No. 2,735,458; U.S. Pat. No. 5,55,788; and Swiss Patent 16606.

In this respect, the modified reciprocating saw blade according to the present invention substantially departs from the conventional concepts and designs of the prior art, and in doing so provides an apparatus primarily developed for the purpose of cutting nails which secure shingles to a mounting surface without damaging adjacent shingles. Such is accomplished by providing a linear saw having a unique combination of features including a predetermined extent for manual handling, a semicircular outboard end, an inboard end with an attachment for the optional releasable attachment to a saw, and a TEFLON coating an entire outer surface thereof to preclude damage to surrounding shingles and the like. Further features included with such combination is a specific length of the saw adapted for manual use and a flexibility for preventing damage from being inflicted on adjacent shingles and a user from scraping his hand.

SUMMARY OF THE INVENTION

In view of the foregoing disadvantages inherent in the known types of saw blades now present in the prior art, the present invention provides an improved modified reciprocating saw blade. As such, the general purpose of the present invention, which will be described subsequently in greater detail, is to provide a new and improved modified reciprocating saw blade and method which has all the advantages of the prior art and none of the disadvantages.

To attain this, the present invention essentially comprises a new and improved modified reciprocating saw blade for use in association with a reciprocating saw blade holder, shingles and nails, the apparatus comprising, in combination: a blade member fabricated of steel and coated with TEFLON, the blade member being 20 and ½ inches in length and formed in an elongated planar generally rectangular configuration with an inboard end, an outboard end and a central section, the inboard end of the blade member being formed as a universal blade mount, the universal blade mount including a projecting member and a circular aperture to permit coupling to a saw blade holder in an operative orientation, the central section having parallel linear upper and lower edges; and the outboard end of the blade member having an upper edge and a lower edge, the lower edge including a cutting region having a length of about one-third of the total length of the blade member, the cutting region being six inches in length and including about eighteen triangular shaped cutting teeth per inch, in an operative orientation the inboard end of the blade member being coupled to a saw blade holder, the configuration of the blade member permitting a user to cut nails which secure shingles without damaging adjacent shingles.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved modified roofing, shingle, and siding removal saw blade which has all the advantages of the prior art saw blades and none of the disadvantages.

It is another object of the present invention to provide a new and improved modified roofing, shingle, and siding removal saw blade which may be easily and efficiently manufactured and marketed.

It is a further object of the present invention to provide a new and improved modified roofing, shingle, and siding removal saw blade which is of a durable and reliable construction.

An even further object of the present invention is to provide a new and improved modified roofing, shingle, and siding removal saw blade which is susceptible of a low cost of manufacture with regard to both materials and labor, and which accordingly is then susceptible of low prices of sale to the consuming public, thereby making such modified roofing, shingle, and siding removal saw blade economically available to the buying public.

Still yet another object of the present invention is to provide a new and improved modified roofing, shingle, and siding removal saw blade which provides in the apparatuses and methods of the prior art some of the advantages thereof, while simultaneously overcoming some of the disadvantages normally associated therewith.

Still another object of the present invention is to cut nails which secure shingles and the like to a mounting surface without damaging adjacent shingles.

Lastly, it is an object of the present invention to provide a new and improved modified reciprocating saw blade for use in association with a saw blade holder, shingles and nails, the apparatus comprises a blade member being formed in an elongated planar configuration with an inboard end, an outboard end and a central section, the inboard end being formed as a universal blade mount to permit coupling to a saw blade holder in an operative orientation, the central section having parallel linear upper and lower edges; and the outboard end of the blade member having an upper edge and a lower edge, the lower edge including a cutting region having a length of about one-third of the total length of the blade member, the cutting region including a plurality of cutting teeth, in an operative orientation the inboard end of the blade member being coupled to a saw blade holder, the configuration of the blade member permitting a user to cut nails which secure shingles without damaging adjacent shingles.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

Similar reference characters refer to similar parts throughout the several views of the drawings.

DESCRIPTION OF THE PREFERRED EMBODIMENT

Figures 1, 2:
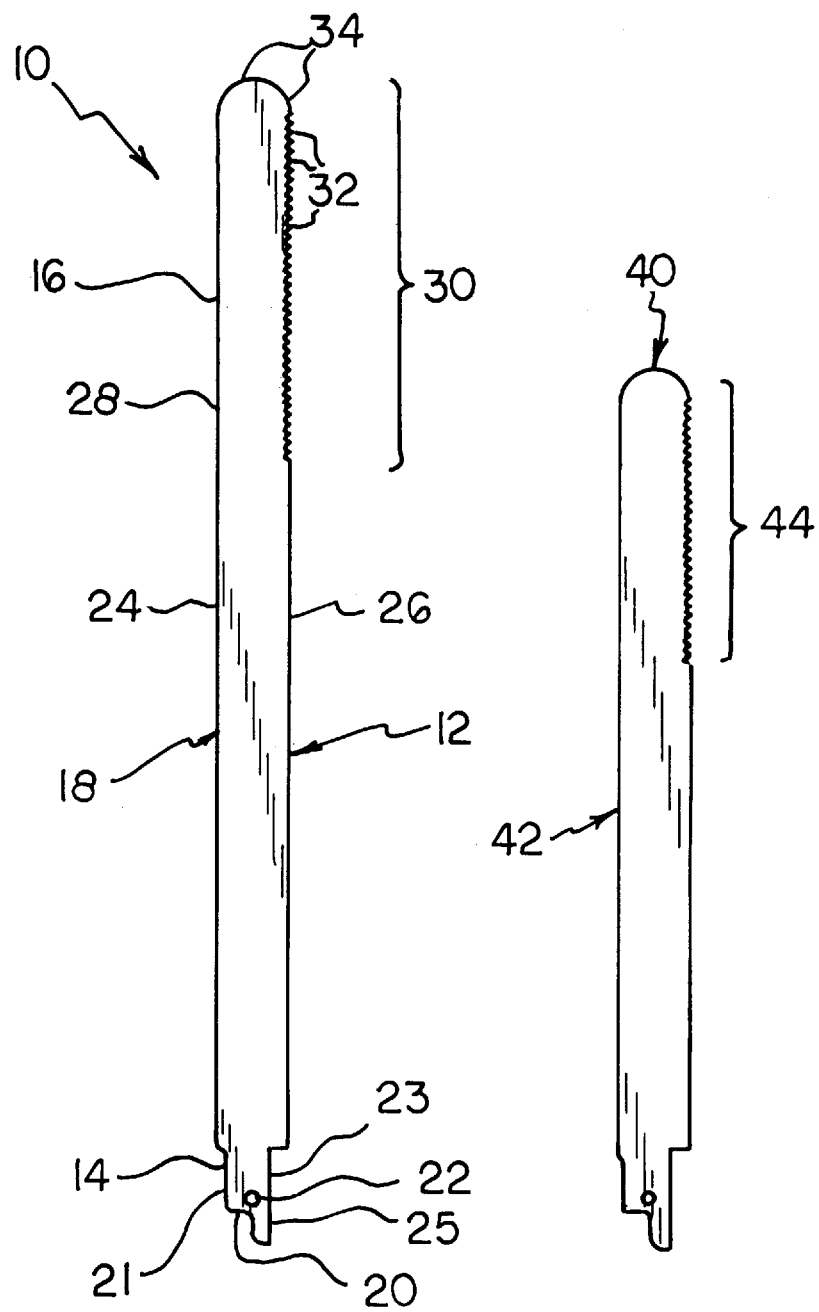
FIG. 1 is a perspective view of the preferred embodiment of the modified reciprocating saw blade constructed in accordance with the principles of the present invention.
FIG. 2 is an alternate embodiment of the modified reciprocating saw blade of a shorter length.

With reference now to the drawings, and in particular to FIG. 1 thereof, a new and improved modified roofing, shingle, and siding removal saw blade embodying the principles and concepts of the present invention and generally designated by the reference numeral 10 will be described.

The present invention, the modified reciprocating saw blade 10 is comprised of a plurality of components. Such components in their broadest context include a blade member 12, an inboard end 14, an outboard end 16 and a central section 18. Such components are individually configured and correlated with respect to each other so as to attain the desired objective.

The modified reciprocating saw blade is adapted to be coupled to the blade holder of a reciprocating saw. Further, the saw blade is further adapted for manual reciprocation. The primary use of the apparatus is to enable a user to cut nails which secure shingles to a mounting surface such as the roof of a house or building. The length of the cutting surface with respect to the length of the blade permits cutting of nails without damaging adjacent shingles and further facilitates manual use. The apparatus also enables the user to remove other materials, such as slate, wood and asbestos without damaging adjacent materials.

The blade member 12 is fabricated of steel and is entirely coated with TEFLON. It is imperative that the blade be flexible. The degree of flexibly is ideally such that the blade is capable of being bent in a complete circle while still being able to return to its natural linear shape. Preferably, the blade has an elongated planar rectangular configuration and a length of 20 and ½ inches. Further, the blade has a width which is ideally ¾ inches and a thickness of 1/32 inches.

The blade member has an inboard end 14, an outboard end 16 and a central section 18. The inboard end of the blade member is formed as a universal blade mount. The universal blade mount includes a rectangular projecting member 20 with a width ¾ that of the blade. As shown in the Figures, the projecting member is situated at the inboard end to define a pair of rectangular cut outs formed on each side thereof. Such cut outs preferably include a first cut out 21 that has less than ⅓ the area of a second cut out 23. A circular aperture 22 is formed on the projecting member at a central extent thereof to permit coupling to a saw blade handle in an operative orientation. Yet another rectangular protrusion 25 extends from the protruding member 20 in coplanar relationship therewith and with a size half that of the protruding member 20. The blade holder of a conventional reciprocating saw includes a pin member which is positioned through the aperture 22 to secure the blade member in place.

The entire blade has parallel linear upper and lower edges 24. Note FIG. 1. The lower edge includes a cutting region 30 which has a length of about one-third of the total length of the blade member. It should be noted that the cutting region resides on the same edge as the larger of the cut outs defined by the protruding member 20. The cutting region is ideally about six to six and ½ inches in length and includes about eighteen triangular shaped cutting teeth 32 per inch. Such teeth have a height of 1/16 of an inch and protrude beyond the lower edge of the blade. The outermost extent 34 of the outboard end 16 includes rounded corners which define ½ of a circle to prevent damage to adjacent materials.

In an operative orientation the inboard end of the blade member is coupled to a saw blade handle or is gripped by a user. The configuration of the blade member permits a user to cut nails which secure shingles without damaging adjacent shingles. During use, the length and flexibility of the blade allow both the central extent and inboard end of the blade to be elevated such that a user's hand or reciprocating saw may be elevated from the shingles. Note FIG. 1.

An alternative embodiment of the apparatus is shown in FIG. 2. In such embodiment, the length of the blade member 42 is eighteen inches and the length of the cutting region 44 is six inches. The blade member of this embodiment is utilized to cut nails which secure small shingles and other small materials. In further alternate embodiments the blade member is fabricated in a plurality of different shapes and sizes to accommodate various carpentry tasks. Note FIG. 2.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications falling within the be resorted to, falling within the scope of the invention.

What is claimed as being new and desired to be protected by Letters Patent of the United States is as follows:

1. A modified reciprocating saw blade for use in association with a reciprocating saw blade holder, shingles and nails, the reciprocating saw blade comprising, in combination:

a blade member fabricated of steel and coated with "TEFLON", the blade member being 20 and ½ inches in length and formed in an elongated planar generally rectangular configuration with an inboard end, an outboard end and a central section, the inboard end of the blade member being formed as a universal blade mount, the universal blade mount including a projecting member and a circular aperture to permit coupling to a saw blade holder in an operative orientation, the central section having parallel linear upper and lower edges; and the outboard end of the blade member having an upper edge and a lower edge, the lower edge including a cutting region having a length of one-third of the total length of the blade member, the cutting region being six inches in length and including about eighteen triangular shaped cutting teeth per inch, the outboard end having an outermost extent including rounded corners, in an operative orientation the inboard end of the blade member being coupled to a saw blade holder, the configuration of the blade member permitting a user to cut nails which secure shingles without damaging adjacent shingles.

\* \* \* \* \*